Aug. 7, 1934.   G. A. HULL   1,969,133
BRAKE DRUM
Filed Nov. 4, 1929   2 Sheets-Sheet 1
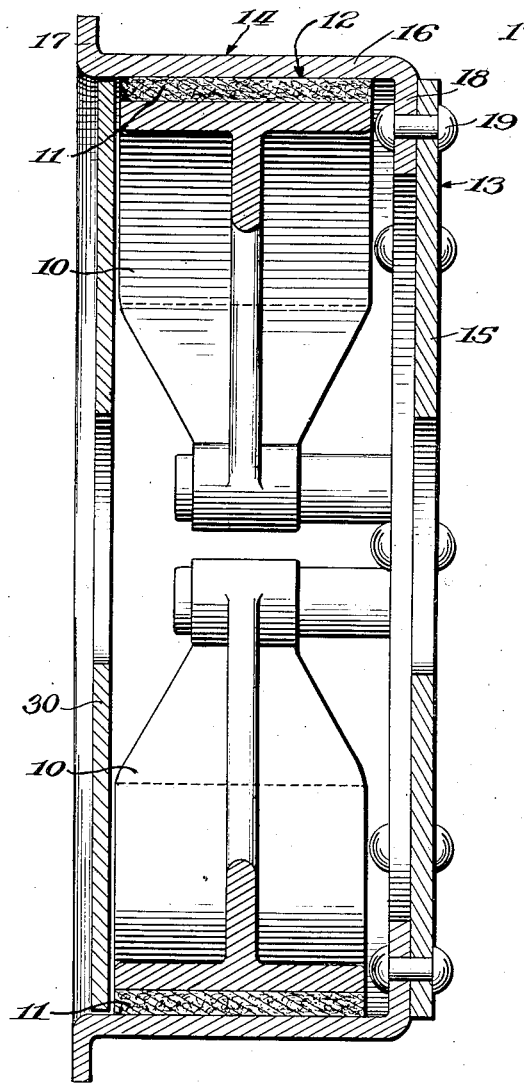
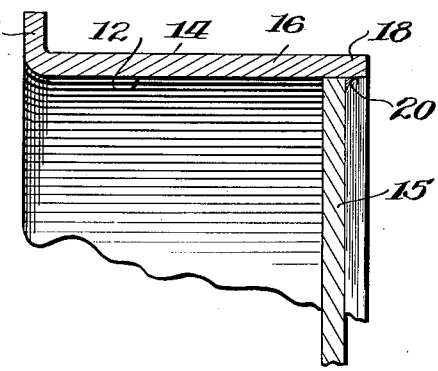
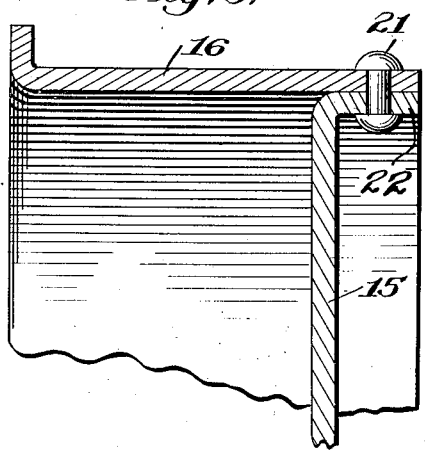
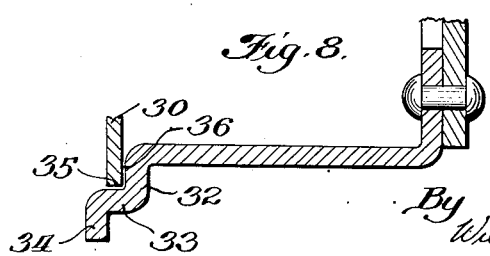
Inventor
George A. Hull.
By Williams, Bradbury, McCaleb & Hinkle
Atty.

Aug. 7, 1934.   G. A. HULL   1,969,133
BRAKE DRUM
Filed Nov. 4, 1929   2 Sheets-Sheet 2
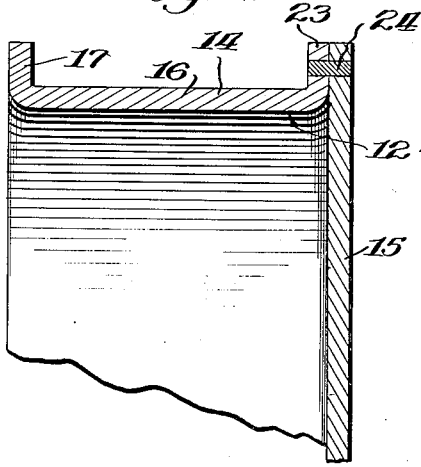
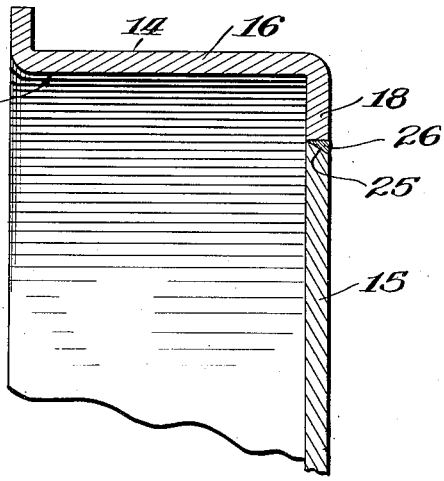
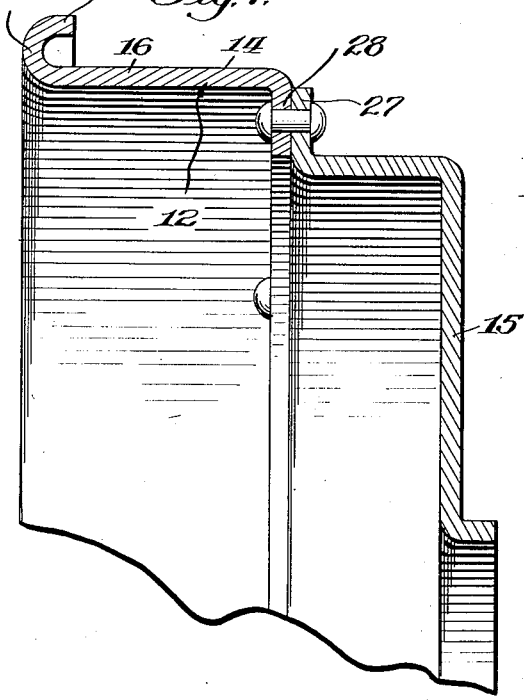
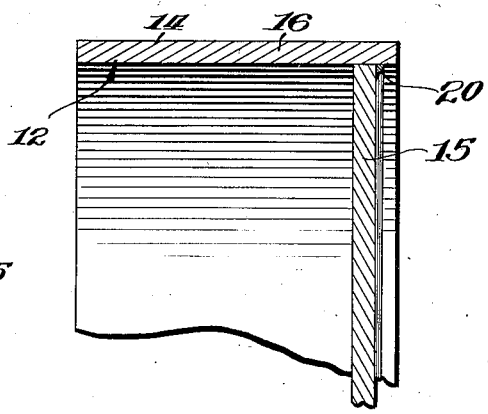
Inventor
George A. Hull Patented Aug. 7, 1934

1,969,133

UNITED STATES PATENT OFFICE 1,969,133

BRAKE DRUM

George A. Hull, Chicago, Ill., assignor to Equipment Specialties Company, Chicago, Ill., a corporation of Illinois Application November 4, 1929, Serial No. 404,564

1 Claim. (Cl. 188—218)

The present invention relates to brake drums, and comprises not only the provision of an improved article of manufacture, but a novel method of making same.

Although the embodiment which has been selected to illustrate the invention is a brake drum, the drums are not confined to use upon brakes, but may be employed in clutches of similar shape, or wherever the characteristics described hereinafter may be found advantageous. The invention is also applicable to braking surfaces of frusto-conical or other shapes than cylindrical, but is of the greatest importance when applied to cylindrical brake drums used in automotive vehicles.

It should also be understood that every embodiment of the invention as an article of manufacture and every practice of the invention as an art, need not include all the features of the invention, but only such features as are capable of producing the results desired in each particular case.

The brake drums of the prior art have been provided with metallic braking surfaces of uniform texture, quality and hardness, and consequently, it was impossible with the prior devices to attain a uniform and stable coefficient of friction on all parts of the drum. Lack of uniformity of the friction surface also contributes to the undesirable phenomenon known as "grabbing" and excessive friction at any point on the drum produces excessive stresses and wear on that part of the drum and lining, and the excessive heat generated at that point quickly burns out or wears out the lining.

In brief, the braking surface which is actually in use under such conditions, may be only a small part of the entire area available, and it is impossible to utilize efficiently the large area of braking surface necessary for modern brakes, without substantial uniformity in quality, texture, hardness and other factors which determine the friction characteristics of the metal surface.

For example, it has been customary in the manufacture of the prior brake drums to form the drum by stamping or pressing the drum out of a single sheet of metal, the outer portions of the blank forming the cylindrical surface of the drum. The sheet metal of which the blanks are made has its grain running in a definite direction, longitudinally of the direction in which the sheet was rolled, and when the drum is made according to the method of the prior art, only a small part of the drum has the grain of the metal running peripherally of the cylindrical surface.

That part of the cylindrical drum surface which is formed by the lateral portions of the blank, has its grain running in one direction; that is, peripherally, but that part of the cylindrical surface that is formed out of the ends of the blank has the grain running transversely to the circumference of the drum. At intermediate points, the grain of the prior drums runs diagonally, or in various other directions, and the operation of drawing the blank into cup shape is inherently incapable of producing a cylindrical braking surface of uniform frictional and wearing characteristics.

The limits of hardness attainable by the old method are also very low, but it is highly desirable that the steel braking surface of the drum be made much harder than the drums have been made in the past. Increase of carbon content is the usual mode of increasing the hardness of the drum, but the present range of carbon content used lies between .08 to .40 of one per cent, and it is impossible to increase the hardness when the old method of drawing drums is used, because the sheet becomes brittle, and it cannot be drawn without breaking if the carbon content exceeds the figures given above.

If the blanks are annealed and pressed cold, a slight increase of carbon content may be made, but any advantage resulting from increase of carbon is often counteracted by the annealing process, which softens the steel. It will be evident, therefore, that the problem of increasing the hardness of the drum could not be solved so long as the old process was used.

One of the objects of the present invention is the provision of an improved drum, having substantial uniformity of braking characteristics over the entire braking surface.

Another object is the provision of an improved method of constructing brake drums, which results in a superior product.

Another object is the provision of an improved method of constructing brake drums, which produces drums of greatly increased hardness, or drums having the grain of the steel running in the same direction at all points on the braking surface.

Another object is the provision of a brake drum, which is tougher, more uniform in quality throughout, harder, and having a uniform coefficient of friction and uniform wearing quality over the braking surface.

Another object is the provision of a plurality of novel brake drum structures, each of which possesses more desirable characteristics, and which are capable of economical manufacture and use on practically all of the modern vehicles.

Other objects and advantages of the invention will be apparent from the following description and from the accompanying drawings, in which similar characters of reference indicate similar parts throughout the several views.

Referring to the drawings, of which there are two sheets;

Fig. 1 is a diagrammatic sectional view of a brake, constructed according to the present invention, the section being taken on a plane through the axis of the brake drum;

Figs. 2 to 8 are each fragmentary sectional views, similar to Fig. 1, of a portion of modified forms of brake drums, each of which has advantages peculiar to its own structure, and which are adapted for use on various modern automotive vehicles.

Referring to Fig. 1, the brake which is diagrammatically illustrated in this view, includes one or more shoes 10, which may be actuated by any conventional mechanism, to expand the brake lining 11 into engagement with the interior cylindrical braking surface 12 of the brake drum, which is indicated in its entirety by the numeral 13. Although the example selected for illustration is an internal expanding brake, the present drums are equally useful for brakes of the external contracting band type, and the present drums may be finished to provide either internal braking surfaces 12, or external braking surfaces 14, depending upon the type of brake desired.

The brake drum 13 preferably consists of a supporting member or plate 15 and a braking member 16, which is secured to the supporting plate 15, and which is adapted to provide one or more braking surfaces 12, 14 of substantial uniform quality, texture, hardness and coefficient of friction. As previously described, this uniformity of texture and frictional characteristics could not be obtained in the brake drums of the prior art, because the supporting plate and friction member 16 were pressed out of a single sheet of material with the grain extending transversely at some parts of the friction member 16, and peripherally at other parts, but the braking member 16 of the present drum is constructed of steel having its grain all running in the same direction, and consequently, there is no difference in texture, hardness or coefficient of friction due to differences in the direction of the grain. Furthermore, the grain in the friction members of the present drums extends peripherally of the drum in such manner that a greater uniformity in finish and smoothness is obtained over the drums of the prior art.

The method of manufacture of the present brake drums is as follows:

The member 16 comprises a piece of very hard and tough rolled steel, which is formed into an elongated blank of the width necessary to form a brake member of the desired shape. This elongated blank has its grain running longitudinally or in the direction of the longest dimension; that is, transversely to the plane of the page in Fig. 1, and the section may be rolled hot after the manner of rolling bars of steel in any particular shape. If the brake drum is to be of the form shown in Fig. 1, the rolled bars will have a section similar to that of member 16, with an upwardly extending flange 17 and a downwardly extending flange 18.

The next step in the manufacture is the cutting of the section into suitable lengths, the length being determined by the circumference of the drum desired, after which the section may be rolled into cylindrical form. In order to allow for the welding operation and for the subsequent shaping operation, the length of the sections should be slightly less than the circumference of the drum.

The ends of each section are then brought into abutting relation and secured together by electric butt welding or by oxyacetylene welding to form a substantially cylindrical drum of slightly smaller size than the drum desired. The welding flash is then trimmed off and the drum is expanded to the proper size, and also made exactly cylindrical in shape by means of a machine having a plurality of radial arms adapted to be forced out at equal radial distance from the center of the drum to expand the drum and bend it into circular shape.

In some cases the method of manufacture will include the step of case hardening or nitriding steel alloys of suitable composition.

The braking member 16 which has been formed by the preceding operations may then be secured to a hub plate 15 by riveting, as in Fig. 1, electric welding as in Fig. 4, or oxyacetylene welding as in Fig. 5. The exact form of the hub plate is dependent upon the type of vehicle to which the drum is to be applied, the amount of room available for a brake drum and structure of the other parts of the brake mechanism.

Brake drums constructed according to the foregoing process of manufacture have the grain running all in the same direction, peripherally of the drum, and the metal friction member having been rolled out of steel, either of the friction surfaces has an extremely hard, tough skin of substantially uniform quality and texture. The brake drums are, therefore, capable of use on the less expensive machines without any grinding or finishing operations, but on the more expensive machines, or in order to attain the best results, the braking surface may be machined or ground and polished to a very hard and bright finish. This finish may be made uniform throughout the entire braking surface because the texture of the steel is the same at all points on the braking surface of the drum.

It has already been pointed out that in the brake drums of the prior art the limits of hardness obtainable were determined by the amount of carbon content permissible for a drawing operation and most of the prior brake drums include a much lower carbon content than the upper range mentioned. The braking members of the present brake drums may be made extremely hard and tough by virtue of the fact that no drawing operations are required, and by virtue of the fact that the rolling operation can be carried out upon steel having a much larger carbon content; for instance, the present drum may be made of steel having .65 of one per cent carbon or higher, or the steel may include .80 or higher per cent manganese and .50 or lower carbon.

It will be understood by those skilled in the art that the carbon has the effect of making the steel harder while the outstanding characteristic of manganese as an ingredient of steel is that it makes the steel tougher. It will thus be observed that high carbon or high manganese steel may be employed or alloy steels including chromium or molybdenum may be employed, thereby greatly increasing the hardness, fineness of texture, toughness, uniformity of quality, and other desirable characteristics of the brake drum. None of the devices of the prior art have the capability of utilizing high carbon, high manganese, or alloy steels for the braking surface, and the term "high carbon steel" is employed in the present specification and claims as meaning any steel having a carbon content substantially in excess of the range used in the prior art, namely, .08 to .40 of one per cent carbon.

The present brake drum may also be constructed of special alloy steels such as nitralloy steel containing aluminum and other elements and having a surface which is extremely hard and capable of giving long wearing characteristics to the drums. In addition to the nitralloy steel, steels of any similar alloy which can be hardened by nitriding, may be employed or any special alloys which are capable of being case hardened. It will thus be observed that the present brake drums may be constructed of extremely hard material which could not be used in the drums of prior art.

Referring to Figs. 1 to 8, the specific structures of the various modified forms of brake drums which result from the process of manufacture described above will be described in detail.

In the device of Fig. 1, the braking member 16 is provided with an outwardly extending flange 17 and an inwardly extending annular attaching flange 18. The flange 17 is intended for stiffening the outer edge of the drum, and consequently, the flange 17 may be at right angles, or at any angle, to accommodate the backing plate 30.

In some embodiments, such as Fig. 6, flanges may be eliminated entirely. In the device of Fig. 1, the attaching flange 18 is secured to a hub plate 15 of substantially circular form by a plurality of rivets 19. It will be understood that any equivalent form of fastening means, such as bolts, electric welding or oxyacetylene welding may be employed, as illustrated in some of the other modifications.

Referring to Fig. 2, this brake drum is provided with a flange 17, but the attaching flange 18 comprises an integral part of the cylindrical body of the braking member. The hub plate 15 is of a size adapted to be received within the cylindrical braking member 16, and the flange 18 projects slightly beyond the hub plate 15, so that the weld 20 may be located in the corner between the flange 18 and the hub plate 15.

In the device of Fig. 3, the braking member 16 is secured by means of a plurality of rivets 21 to a substantially cylindrical attaching flange 22 carried by hub plate 15. The width of the braking member 16 in Figs. 2 and 3 is increased over that of Fig. 1, in order to provide sufficient material for securing the braking member and hub plate together, without diminishing the size of the drum.

In the brake drum of Fig. 4, the braking member 16 has a flange 17 and an outwardly extending attaching flange 23, which is secured to an enlarged hub plate 15 having a diameter equal to the outer diameter of the attaching flange 23. The attaching flange 23 and hub plate 15 are spot welded together at 24.

The brake drum illustrated in Fig. 5 has a friction member 16 of substantially the same shape as that shown in Fig. 1, but the hub plate 15 is of a size adapted to be received within the circular aperture formed by the attaching flange 18. Either the hub plate 15 or the attaching flange 18 may be beveled off as at 25 to form a groove for receiving the oxyacetylene weld, or electric weld 26, which secures these two members together.

The relatively simple drum illustrated in Fig. 6 is capable of being made of harder material than any of the other drums illustrated, because the friction member 16 comprises a simple cylindrical member without any transverse flanges. The hub plate 15 may be secured to the friction member 16 in the same manner as that described with respect to Fig. 2.

The brake drum illustrated in Fig. 7 is adapted to be substituted for the type employed upon a familiar type of car, and this drum is an illustration of the variation in structure which may be made to accommodate the drum to the particular brake mechanism. The hub plate 15 of this device is of substantially cup shape with an annular attaching flange 27 secured to an inwardly extending attaching flange 18 carried by friction member 16. Since the desired brake drum structure includes a backwardly curved flange 29, the friction member 16 may be rolled into substantially the same form as that shown in Fig. 1, and when the friction member is extended to proper size and accurately circular form, the flange 17 may be curled over to form the flange 29.

Fig. 8 is a fragmentary view, showing a section of a part of a drum in which one edge of the friction member is provided with an outwardly projecting flange 32, a laterally projecting cylindrical flange 33, and another outwardly projecting flange 34, forming an annular recess 35 and a seating surface 36 for receiving the backing plate 30. The other details of this modification may be substantially similar to any of those previously described, but it will be evident that this form of the device is peculiarly adapted to provide a simple, yet effective, form of securement for the backing plate 30.

The backing plate 30 may have a pressed fit in the recess 35, so that the edges of the backing plate 30 are in close frictional engagement with the cylindrical flange 33 or the backing plate may be secured with ordinary securing devices.

It should also be noted that the machinery for carrying out the foregoing steps in the process of manufacture, will be evident to one skilled in the art, and consequently, it is not necessary to illustrate the apparatus required.

The drums constructed according to the present invention may be made of extremely hard, tough material, with the grain running peripherally of the braking surface, so that a high degree of uniformity of braking characteristics and coefficient of friction may be attained.

The present brake drum is capable of accomplishing a substantial improvement in operating characteristics when employed with ordinary brake linings. However, the drum is preferably employed with friction lining material, made of asbestos, into which metallic lead has been incorporated, as described in the co-pending applications of Rudolph L. R. Wild, Serial No. 327,199, filed December 20, 1928, Patent Number 1,741,896, and Serial No. 410,625, filed Nov. 29, 1929, Patent Number 1,803,448.

The coefficient of friction of most frictional surfaces decreases with an increase of temperature, but the coefficient of the friction of lead increases with an increase of temperature, and consequently, the incorporation of lead in the friction surface tends to stabilize the coefficient of friction. Metallic lead also acts as an inhibitive agent for preventing the formation of abrasive materials by the action of the heat on the asbestos.

It will thus be observed that I have invented a novel method of manufacture of brake drums, which results in a superior product, having the grain of the metal running in the direction of the relative movement between the respective braking members. The brake drums constructed according to the present invention may also be made of high carbon or high manganese steel or of alloy steel, thereby greatly increasing the hardness, toughness, wearing qualities and uniformity of texture of the friction surface of the drum.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

A brake drum comprising a hardened steel member formed of a strip of metal with its ends welded together and having the grain of the metal all extending in the same direction to form a braking surface of uniform characteristics, said drum having an inwardly extending annular flange and a supporting plate adapted to fit against the edge of said flange forming a weld receiving groove, and a weld in said groove.

GEORGE A. HULL.